US005820812A

United States Patent [19]
Miller et al.

[11] Patent Number: 5,820,812
[45] Date of Patent: Oct. 13, 1998

[54] PROCESS FOR STRENGTHENING COLLAGEN CASINGS USING ULTRAVIOLET IRRADIATION

[75] Inventors: Albert T. Miller, Bridgewater, N.J.; Robert B. Marder, Staten Island, N.Y.

[73] Assignee: Nitta Castings, Inc., Somerville, N.J.

[21] Appl. No.: 868,139

[22] Filed: Jun. 3, 1997

[51] Int. Cl.⁶ ............................. B29C 35/10; B29C 55/28
[52] U.S. Cl. ..................... 264/477; 264/129; 264/150; 264/202; 264/209.1; 264/209.3; 264/340; 264/495; 264/564; 427/384; 427/389; 427/512
[58] Field of Search ................................ 264/129, 150, 264/202, 209.1, 209.3, 340, 464, 477, 495, 564; 427/384, 389, 512

[56] References Cited

U.S. PATENT DOCUMENTS

| | | |
|---|---|---|
| 3,123,482 | 3/1964 | Lieberman ........................ 426/140 |
| 3,315,300 | 4/1967 | Ziolko ............................. 452/24 |
| 3,413,130 | 11/1968 | Rose .............................. 426/277 |
| 3,535,125 | 10/1970 | Fagan ............................ 426/277 |
| 3,821,439 | 6/1974 | Cohly et al. ..................... 426/277 |
| 3,894,158 | 7/1975 | Miller ............................. 426/63 |
| 4,038,438 | 7/1977 | Rahman et al. ................ 427/385.5 |
| 4,076,846 | 2/1978 | Nakatsuka et al. ................ 426/62 |
| 4,388,331 | 6/1983 | Miller ............................ 426/277 |
| 4,406,853 | 9/1983 | Miyata ........................... 264/304 |
| 5,322,648 | 6/1994 | Dapper ........................... 264/1.1 |
| 5,480,427 | 1/1996 | Kelman et al. .................... 623/6 |
| 5,571,216 | 11/1996 | Anderson ......................... 623/66 |

*Primary Examiner*—Leo B. Tentoni
*Attorney, Agent, or Firm*—Eric P. Schellin

[57] ABSTRACT

Conventionally produced edible tubular casing is improved in its mechanical properties by being exposed to ultraviolet spectra in the range of 180 nm to 420 nm. The so treated casing is humidified, collapsed and wound onto a reel. The reel of tubular casing may be transported to a point of use where it is unwound, inflated, shipped and cut into lengths as desired.

9 Claims, 1 Drawing Sheet

PROCESS FOR STRENGTHENING COLLAGEN CASINGS USING ULTRAVIOLET IRRADIATION

BACKGROUND OF THE INVENTION

Reconstituted collagen is widely used in the manufacture of tubular sausage casings. The collagen used in these casings is usually derived from the corium layer of bovine hides. The collagen raw material is comminuted, mixed with a swelling agent to produce a uniform dispersion from which a continuous tube is formed. The tube is then neutralized by the injection of gaseous ammonia or by contact with a liquid salt solution. The casing is washed in water to remove neutralization salts and plasticized by passing it through successive liquid baths and dried while inflated. Examples of such processes are disclosed in U.S. Pat. No. 3,535,125, 3,821,439 and 4,388,331.

Many procedures have been developed in an attempt to improve the wet strength and thermal resistance of collagen casings. A number of aldehyde cross-linking methods have been employed to strengthen the reconstituted casing. Rose, U.S. Pat. No. 3,413,130, utilized a glutaraldehyde solution, while McNight, U.S. Pat. No. 3,151,990, used dextrose and Miller, U.S. Pat. No. 3,894,158, used liquid smoke as the aldehyde source. Although these methods are satisfactory for use in collagen casings for application in frankfurter or dry sausage products, they are unsuitable for use in the manufacture of fresh pork sausage products. The eating quality (tenderness) of this product is diminished and the casing is subject to failures in the consumer cooking procedures i.e., grill or deep fat fry.

To overcome the above deficiencies, Lieberman, U.S. Pat. No. 3,123,482, adopted the use of a heat cure procedure where the dried shirred casing was heated in a forced draft oven at 80° C. and 27% relative humidity for 24 hours. The casing so obtained had adequate wet strength and could survive satisfactorily under the rigors of cooking.

Unfortunately, the heat cure method does not lend itself to continuous methods of casing manufacture. The shirred casing strands must be placed in specially designed holey boxes and dried at relatively low air temperature to avoid protein denaturation. The temperature is then raised to the maximum cure desired and held at this level for periods of four to sixteen hours. The dried cured strands must be rehumidified again prior to packaging.

Another disadvantage of the heat cure method is that the product is shirred at low moisture i.e., 12% instead of finished product moisture which is generally 18%. This is done because the added moisture must be subsequently removed prior to reaching the proper heat cure temperature to avoid product degradation. The lower moisture condition for shirring results in greater product damage (loss in tensile strength) and poorer strand compression. In addition, rehumification of the cured strand results in shirred product expansion. This condition produces a smaller internal bore and less rigid strand which are disadvantages in high speed automatic filling of the tubing.

Still another disadvantage of the heat cure method is that the outer ridge of the pleats on the shirred strand becomes case-hardened due to greater exposure to the heat and oxidation. This results in a defect known as "spiraling" when the filled casings are thermally processed and dip dyed. The exposed surface area on the casing pleats fails to absorb dye at the same rate as the remaining surface, thus forming an undyed line around the filled casing circumference.

It is an object of the present invention, therefore, to produce a new and improved collagen casing which is useful in a wide range of sausage applications, without the disadvantages of the prior art methods.

It is a further object of the present invention to continuously cure a collagen casing on-line, thus avoiding the time consuming and highly variable batch heat cure procedure.

It is another object of the present invention to produce an improved casing for use in processing encased sausage through a thermal dye process without encountering the typical spiral line which is encountered in casings prepared using the traditional heat cure process.

It is another object of the present invention to produce a continuously cured collagen casing which has improved uniformity in tensile values and thermal resistance.

It is another object of the present invention to produce a high strength collagen casing which has improved mechanical properties.

SUMMARY OF THE INVENTION

Conventionally produced edible tubular casing is improved in its mechanical properties by being exposed to ultraviolet spectra in the range of 180 nm to 420 nm. The so treated casing is humidified, collapsed and wound onto a reel. The reel of tubular casing may be transported to a point of use where, it is unwound, inflated, shirred and cut into lengths as desired.

PRIOR ART DISCLOSING USE OF ULTRAVIOLET IRRADIATION

Ultraviolet irradiation has been shown to modify proteins in general (McLaren and Shugar. 1964) and collagen in particular (Cooper and Davidson, 1965; Nishigai, 1964). The effect of ultraviolet light on skin has been interpreted as causing "aging" in collagen through cross-linking within the collagen fibrils (Bottoms and Shuster, 1963). U.S. Pat. No. 4,076,846 to Nakatsuka et al, discloses the use of ultraviolet light in the cross-linking of an edible, water soluble, thermoplastic molding composition. The shaped article can be allowed to have any balance between its water resistance and its water solubility by ultraviolet irradiation.

German Patent Application 10 DE 42 OB 435 A1, Oct. 28, 1993, discloses a method of producing water resistant, but biologically degradable foils from gelatin, The foils are polymerized after the shaping by means of irradiation with known U.V. light sources. U.S. Pat. No. 5,480,427 covers biologically compatible reaction products from collagen which are polymerized by exposure to U.V. radiation. The material is molded to form useful medical implant articles. U.S. Pat. No. 5,322,648 covers a method for fabricating shaped articles from aqueous collagen-containing materials which have application for lenticular devices used in ophthalmologic treatment of trauma. The dried collagen shield is exposed to U.V. light to effect cross-linking of the product. U.S. Pat. No. 5,571,216 discloses a method of joining two collagen materials in which the joined surfaces are cross-linked with the aid of U.V. irradiation.

DETAILED DESCRIPTION OF THE INVENTION

HIDE PREPARATION

Figure 1:
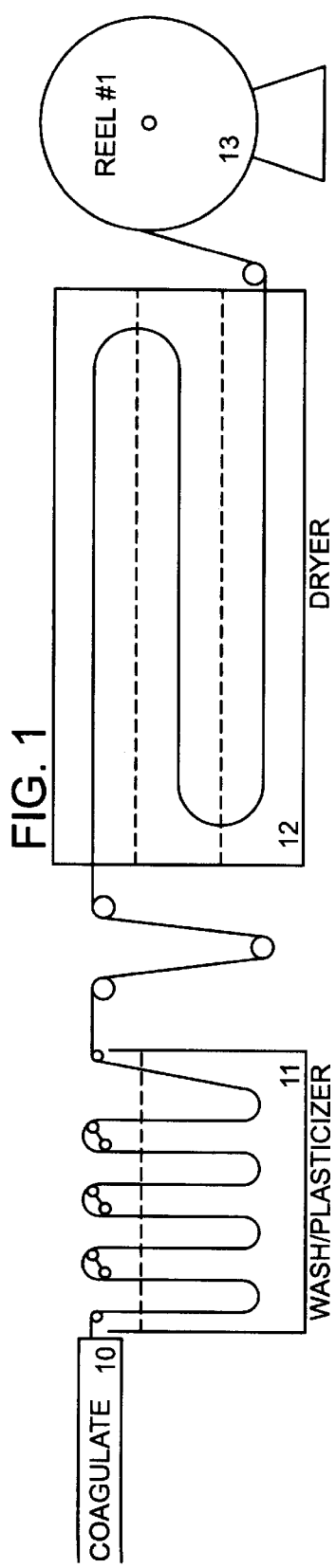
FIG. 1 is a schematic view of casing production showing coagulation, washing/plasticizing, drying and reeling.

Hides from freshly slaughtered animals are weighed and batched into lots of 2700 kilograms. They are washed for three hours in continuously running water at a temperature of 20° C. to 21° C.

To a paddle vat of suitable capacity is added 6130 kilograms of water and the 2700 kilograms of washed hides.

Twenty-two kilograms of sodium carbonate are added to the vat and the paddle run for one and one-half hours.

Fifty-four kilograms of sodium sulfhydrate are then added and the paddle run for a further one hour, after which time, eight kilograms of sodium sulfide are added. The paddle is run for 15 minutes before a further 54 kilograms of sodium sulfhydrate, plus 81 kilograms of hydrated lime are added. After this addition, the paddle is run for six and one-half hours.

At the end of this time, the vat is drained of chemical solution, and the hides are flood washed in 21° C. water for three hours. They are then removed for a first defleshing.

The fleshed hides are returned to the paddle vat, washed clean with well water at 15° C., then drained.

The paddle vat is recharged with 6130 kilograms of water and 22.5 kilograms of sodium bicarbonate, plus 81 kilograms of hydrated lime are added. The paddle is run for 12 to 18 hours.

The hides are removed from the vat and, after any needed trimming, are split on a leather splitting machine to separate the grain layer from the corium.

The corium layer is sided (split in half), given a second defleshing and placed in a drum for a final 30 minutes wash with well water. A typical yield of corium is 700 kilograms.

CORIUM BUFFERING

The bovine corium collagen layer, as produced in the above, must be buffered to pH 4.6 before being further treated to render it suitable for use in making collagen casing. The buffering is done by the following process:

A large fiberglass drum (capacity 2000 kg) is charged with 700 kilograms of corium collagen prepared as described above.

Eleven hundred and twenty (1120) kilograms of tempered (20° C.) water and 3.5 kilograms of ammonium sulfate are added, and the drum is rotated for one hour and 50 minutes.

The treatment solution is drained, the drum recharged with the same weights of water and ammonium sulfate, and the hide further treated for a second period of one hour and 50 minutes.

At the end of this time, the treatment solution is drained, and the corium is flood washed with tempered water for two and one-half hours using a flow rate of 120 liters of water/minute.

After complete draining, the drum is charged with 1120 kilograms of tempered (20° C.) water to which is added 4.9 kilograms of citric acid and 616 kilograms of sodium citrate. The drum is rotated for 12 to 14 hours.

Periodic (two hours) pH measurements are taken on the buffer solution. Citric acid additions are made as needed based on the results of these two hour tests to maintain the pH at 4.6.

At the end of the buffer treatment, the buffered corium is washed to remove residual citrate before being stored under refrigeration until use.

PREPARATION OF EXTRUSION MASS

The hides which have been dehaired with lime and then unlimed (delimed), are then shredded and ground to a particle size of approximately one-fourth inch.

The ground particles in an mount of 15.35 kgs, containing 4.05 kgs of dry hide solids, are mixed with 29.65 kgs of water, and the mixture is passed through a high speed cutting mill where the hide particles are shredded to form a hydrated mass of fibrous character.

In a stainless steel tank, 0.85 kgs of cellulose fibers are thoroughly dispersed with 43.58 kgs water. To this cellulose dispersion is added 0.566 kgs of 31.5% hydrochloric acid with complete mixing. The mass of fibrous hydrated collagen from the high speed cutting mill and the acid-cellulose-water mixture are blended together to form a swollen collagen mass or gel. After storage for period of 20 hours, the mixture of cellulose and acid-swollen collagen is further dispersed with a homogenizer fitted with a two stage valve and operated with a 1500 psi drop per stage. The mixture is homogenized a second time at 2000 psi. The homogenized mixture is pumped to a storage tank and deaerated under vacuum and aged for a period of 24 hours at 20° C. The dispersion so obtained has the following composition:

|  | Percent |
| --- | --- |
| Hide Solids | 4.50 |
| Cellulose | 0.90 |
| Hydrochloric Acid | 0.198 |

EXTRUSION

The homogenized dispersion is pumped from the storage vessel through a wound wire filter and then to a metering pump at the rate of 296 gms/minute. The mass is extruded through a disk extruder of the type illustrated in FIG. 1 of U.S. Pat. No. 3,122,788 which is incorporated herein by reference. The extruder is cooled by circulation of fluid through the jacket at 9° C. The extruded collagen casing, which is supported on a conveyor belt, is inflated with air to a diameter of 32 mm and coagulated with anhydrous ammonia. The coagulated, neutralized casing is flattened between pinch rollers and falls from the end of the belt into the holding baskets within the water wash tank. The casing is transferred through a series of compartments within the tank by the godets and is subjected to intimate contact with the wash water which circulates through the openings in the walls of each compartment. The total dwell time of the casing in the water wash tank is 20 minutes.

The plasticizer composition within the plasticizer tank is an aqueous solution of 4.5% glycerin and 1.0% CMC (carboxymethylcellulose). The dwell time of the casing in the plasticizer is 7.5 minutes.

The casing is then inflated with air and passed directly into the first section of a drying chamber which is heated to 160° F. The dwell time of the casing in the first section of the drying chamber is approximately 2½ minutes. The inflated casing next enters a second section of the drying chamber which is heated to 132° F. The dwell time of the casing in the second section of the drying chamber is about one minute. The inflated casing then enters a third section of the drying chamber where the temperature is about 90° F. and the dwell time is about one-half minute. As the casing leaves the third section of the dryer, it is collapsed and wound on a reel.

FIG. 1 shows schematically the latter step wherein the extruded casing is coagulated in chamber 10, then washed and plasticized in vat 11. The casing is then conveyed into a dryer 12 which in the instant matter is a multi-sectioned dryer. Finally, a take up reel 13 winds up the collapsed casing.

EXAMPLE I

Figure 2:
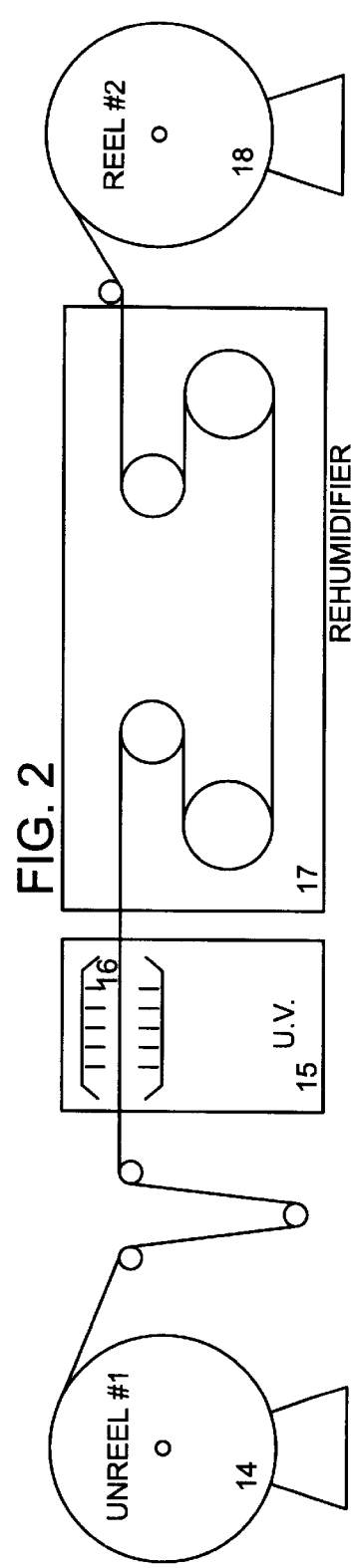
FIG. 2 is a schematic view of a subsequent step showing U.V. irradiation.

FIG. 2 shows collagen casing prepared by the preliminary processing methods previously described being unwound from a reel 14 and conveyed through an ultraviolet curing chamber 15 fitted with upper and lower mercury vapor lamps emitting ultraviolet spectra in the range of 180 nm to 420 nm. Each lamp is 12 inches in length and is operated at 300 watts/inch. Parabolic reflectors are used to ensure that all surfaces on the casing are uniformly treated. Quartz filters are mounted between the ultraviolet lamp and the casing to filter out the infra-red spectra that might generate excessive heat. Air blowers are also employed to minimize heat buildup. The distance from the lamp to the casing surface is 4½ inches. The casing is conveyed through the curing chamber at a rate of 200 fpm.

The ultraviolet cured casing is then conveyed through a humidification chamber 17 to raise the moisture content of the casing from approximately 12 to 13% to approximately 18%. It is then coated with a thin layer of mineral oil before being shirred on an apparatus similar to that described and claimed in U.S. Pat. No. 3,315,300 which is incorporated herein by reference.

The casing prepared in the above method had improved strength to withstand the stresses of high speed frankfurter stuffing and linking equipment and survived the rigors of the thermal processing procedures used in smoking and cooking.

Figure 3:
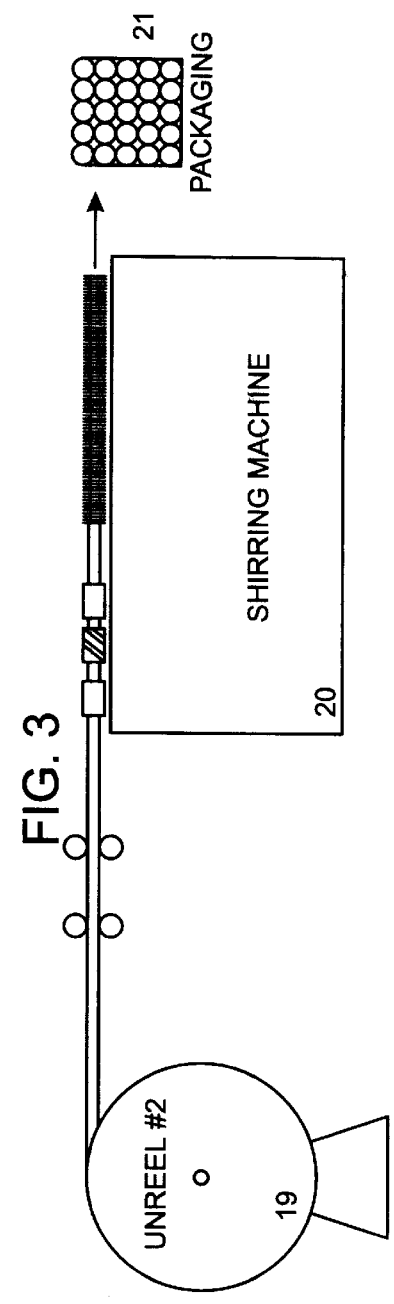
FIG. 3 is a schematic view of shirring the casing and loading it into a carton.

The casing may then be wound onto reel 18 and shipped in that form to an ultimate destination of use. Such use being illustrated by FIG. 3 wherein a reel of casing 19 is unwound, then inflated and coated with a thin layer of mineral oil before being shirred on apparatus 20, similar to that described in U.S. Pat. No. 3,315,300, which is incorporated herein by reference. The shirred product is cut in suitable lengths and conventionally packaged in carton 21.

EXAMPLE II

The homogenized dispersion prepared as described previously is extruded under pressure to form a thin wall collagen tubing of approximately 21 mm diameter. The tubing is inflated with air and coagulated with an anhydrous ammonia gas which is applied internally and externally to the casing surface. The coagulated, neutralized casing is flattened between pinch rolls and processed through a water wash bath. The casing is then transferred to a plasticizer bath containing 5.5% glycerin and 1.35% CMC (7LF). To this plasticizer bath was also added a food grade caramel coloring tradenamed Maillose 300100 and marketed by Red Arrow Products, Inc. in Manitowoc, Wis. The Maillose is a clear brown liquid with the following chemical properties:

| Brix | 12° |
| --- | --- |
| Density | 8.75 lbs./gallon |
| pH | 2.5–3.0 |
| Bound DEAE color | 50% |
| Bound Phosphoryl | 50% |
| Total Nitrogen | 0.1% |
| Total Sulfur | 0.3% |
| Sugars | 3.9% |

The concentration of Maillose in the plasticizer solution was 1000 ppm. The dwell time of the casing in the plasticizer is eight (8) minutes.

The casing is then inflated with air, dried to approximately 12% moisture and wound on a reel.

EXAMPLE III

Collagen casing prepared by the methods of Example II was unwound from a reel and conveyed through an ultraviolet curing chamber which was fitted with two parallel ultraviolet lamps (AUV #941221MCB) mounted perpendicular to the flow of the casing. Both lamps were mounted above the location of the casing path. The distance of the exposed lamp path was 5 inches and the casing was traveling at a speed of 100 fpm. The lamps were operated at 300 watts/inch. After the casing was treated on one side, it was immediately inverted and sent through the U.V. chamber a second time at the same rate so as to evenly treat both casing surfaces. After ultraviolet treatment the casings were humidified to a nominal 18% moisture. Physical testing of the product was carried out using the methods disclosed in U.S. Pat. No. 4,388,331 which is incorporated herein in its entirety by reference. Comparative strength testing of the casings showed the following:

|  | Wet Tensile | HAT |
| --- | --- | --- |
| No Maillose | 3.34 kg. | 1.44 kg. |
| 1000 ppm Maillose | 3.98 kg. | 2.35 kg. |

What is claimed is:

1. A method for improving the mechanical properties of a collagen food casing comprising, treating said food casing with ultraviolet spectra in the range of 180 nm to 420 nm.

2. The method for improving the mechanical properties of a collagen food casing according to claim 1 wherein the ultraviolet treated casing is humidified to approximately 18% water content.

3. A method for improving the mechanical properties of a collagen food casing comprising treating said casing with an aqueous solution containing caramel, then treating said casing with ultraviolet spectra in the range of 180 nm to 420 nm.

4. The method for improving the mechanical properties of a collagen food casing according to claim 3 wherein the ultraviolet treated casing is humidified to approximately 18% water content.

5. A method for improving the mechanical properties of a collagen food casing comprising, extruding a slurry of finely divided collagen to form a tube, coagulating the extruded tube, drying said tube to between about 12 to 13% water content, then treating said tube with ultraviolet spectra in the range of 180 nm and 420 nm, thereafter rehumidifying said tube to approximately 18% water content.

6. A method for improving the mechanical properties of a collagen food casing comprising, extruding a slurry of finely divided collagen to form a tube, coagulating the extruded tube, drying said tube to between 12 to 13% water content, collapsing said tube, winding said tube onto a reel, thereafter unwinding said tube from said reel, then treating said tube with ultraviolet spectra in the range of 180 nm and 420 nm, rehumidifying said tube to approximately 18% water content, collapsing and rewinding said tube onto a reel.

7. A method for improving the mechanical properties of a collagen food casing comprising, extruding a slurry of finely divided collagen to form a tube, coagulating the extruded tube, drying said tube to between 12 to 13% water content, collapsing said tube, winding said tube onto a reel, thereafter unwinding said tube from said reel, then treating said tube with ultraviolet spectra in the range of 180 nm and 420 nm, rehumidifying said tube to approximately 18% water content, collapsing and rewinding said tube onto a reel, unwinding said tube from the reel, inflating said tube, shirring said tube, cutting said shirred tube into selected lengths and packaging said lengths of shirred tube.

8. A method for improving mechanical properties of a collagen food casing comprising, extruding a slurry of finely divided collagen to form a tube, coagulating the extruded tube, treating said tube with an aqueous solution containing caramel, drying said tube to between 12 to 13% water content, collapsing said tube, winding said tube onto a reel, thereafter unwinding said tube from said reel, then treating said tube with ultraviolet spectra in the range of 180 nm and 420 nm, rehumidifying said tube to approximately 18% water content, collapsing and rewinding said tube onto a reel.

9. A method for improving mechanical properties of a collagen food casing comprising extruding a slurry of finely divided collagen to form a tube, coagulating the extruded tube, treating said tube with an aqueous solution containing caramel, drying said tube to between 12 to 13% water content, collapsing said tube, winding said tube onto a reel, thereafter unwinding said tube from said reel, then treating said tube with ultraviolet spectra in the range of 180 nm and 420 nm, rehumidifying said tube to approximately 18% water content, collapsing and rewinding said tube onto a reel, unwinding said tube from the reel, inflating said tube, shirring said tube, cutting said shirred tube into selected lengths and packaging said lengths of shirred tube.

* * * * *